(12) United States Patent
Dong

(10) Patent No.: US 11,454,945 B2
(45) Date of Patent: Sep. 27, 2022

(54) METHOD AND DEVICE FOR CALLING PROGRAM MODULE IN PLC LADDER PROGRAMMING ENVIRONMENT

(71) Applicant: Siemens Aktiengesellschaft, Munich (DE)

(72) Inventor: Xiao Rui Dong, Qingdao (CN)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 17/603,680

(22) PCT Filed: Apr. 16, 2019

(86) PCT No.: PCT/CN2019/082888
§ 371 (c)(1),
(2) Date: Oct. 14, 2021

(87) PCT Pub. No.: WO2020/210985
PCT Pub. Date: Oct. 22, 2020

(65) Prior Publication Data
US 2022/0091574 A1    Mar. 24, 2022

(51) Int. Cl.
*G05B 19/05* (2006.01)
(52) U.S. Cl.
CPC .. *G05B 19/056* (2013.01); *G05B 2219/13004* (2013.01); *G05B 2219/13052* (2013.01)
(58) Field of Classification Search
USPC .......................................................... 700/86
See application file for complete search history.

(56) References Cited

U.S. PATENT DOCUMENTS

| 5,142,469 A | * | 8/1992 | Weisenborn | ......... G05B 19/056 700/17 |
| 5,321,829 A |  | 6/1994 | Zifferer |  |
| 5,867,382 A |  | 2/1999 | McLaughlin |  |
| 6,819,960 B1 | * | 11/2004 | McKelvey | ................ G06F 8/24 700/17 |
| 7,324,856 B1 | * | 1/2008 | Bromley | .............. G05B 19/056 700/86 |
| 2002/0101451 A1 |  | 8/2002 | Duemler |  |

(Continued)

FOREIGN PATENT DOCUMENTS

CN    103123598 A    5/2013

OTHER PUBLICATIONS

International Search Report and Written Opinion dated Jan. 15, 2020 in International Application No. PCT/CN2019/082888.

*Primary Examiner* — Md Azad
(74) *Attorney, Agent, or Firm* — Harness, Dickey & Pierce, P.L.C.

(57) ABSTRACT

A method for calling a program module in a programmable logic controller (PLC) ladder programming environment comprises: determining a first feature to be called in a PLC ladder programming environment and a second feature not to be called from features implemented by an artificial intelligence (AI) module compiled by a computer programming language; configuring the first feature as an interface conforming to an interface specification of the PLC ladder programming environment; configuring the second feature as a non-call method; packaging the non-call method and the interface into a dynamic link library (DLL); importing the DLL into the PLC ladder programming environment.

5 Claims, 11 Drawing Sheets

(56) References Cited

U.S. PATENT DOCUMENTS

| | | | | |
|---|---|---|---|---|
| 2004/0098141 A1* | 5/2004 | Martin | ............ | G05B 19/056 |
| | | | | 700/18 |
| 2005/0203648 A1* | 9/2005 | Martin | ............ | G06F 9/547 |
| | | | | 700/87 |
| 2005/0228516 A1* | 10/2005 | Phillips | ............ | G05B 19/056 |
| | | | | 700/87 |
| 2010/0180267 A1 | 7/2010 | Huang et al. | | |
| 2014/0059518 A1* | 2/2014 | Sierk | ............ | G06F 30/34 |
| | | | | 717/107 |

* cited by examiner

- ▶ 📁 System blocks
- ▶ 📁 Technology objects
- ▼ 📁 External source files —— 70
  - 📄 Add new external file
  - 📄 ODK_zeromq.scl —— 71
- ▶ 📁 PLC tags
- ▶ 📁 PLC data types
- ▶ 📁 Watch and force tables
- ▶ 📁 Online backups

Fig.3

| | Name | Data type | Start value | Retain | Accessible | Writa... | Visible in... | Setpoint | Supervi... |
|---|---|---|---|---|---|---|---|---|---|
| | ODK_ZEROMQODK_mqClient_i_i_i_o_o_img_DB_ANA_AUTO_CAMERA_1 | | | | | | | | |
| 1 | ▶ Input | | | | | | | | |
| 2 | • REQ | Bool | false | ☐ | ☐ | ☐ | ☐ | ☐ | |
| 3 | • myIpport | String[254] | ... | ☐ | ☑ | ☑ | ☑ | ☐ | |
| 4 | • myRequest1 | String[254] | ... | ☐ | ☑ | ☑ | ☑ | ☐ | |
| 5 | • myRequest2 | String[254] | ... | ☐ | ☑ | ☑ | ☑ | ☐ | |
| 6 | ▶ Output | | | | | | | | |
| 7 | • ERROR | Bool | FALSE | ☐ | ☑ | ☑ | ☑ | ☐ | |
| 8 | • DONE | Bool | FALSE | ☐ | ☑ | ☑ | ☑ | ☐ | |
| 9 | • BUSY | Bool | FALSE | ☐ | ☑ | ☑ | ☑ | ☐ | |
| 10 | • STATUS | int | 0 | ☐ | ☑ | ☑ | ☑ | ☐ | |
| 11 | • myPass | Bool | false | ☐ | ☑ | ☑ | ☑ | ☐ | |
| 12 | • myRely | String[254] | ... | ☐ | ☑ | ☑ | ☑ | ☐ | |
| 13 | ▶ InOut | | | | | | | | |
| 14 | ▶ Static | | | | | | | | |
| 15 | • _odk_internal_Last_B... | Bool | FALSE | ☐ | ☑ | ☑ | ☑ | ☐ | |
| 16 | • _odk_internal_Last_B... | Bool | FALSE | ☐ | ☑ | ☑ | ☑ | ☐ | |
| 17 | ▲ ODK_ExcA_Instance | ODK_ExcA | | | | | | | |
| 18 | ▲ _odk_internal_IN_BU... | Array[0..767] of Byte | | ☐ | ☑ | ☑ | ☑ | ☐ | |
| 19 | ▲ _odk_internal_OUT_B... | Array[0..767] of Byte | | ☐ | ☑ | ☑ | ☑ | ☐ | |

Fig.5

METHOD AND DEVICE FOR CALLING PROGRAM MODULE IN PLC LADDER PROGRAMMING ENVIRONMENT

CROSS-REFERENCE TO RELATED APPLICATION(S)

This application is the National Phase under 35 U.S.C. § 371 of PCT International Application No. PCT/CN2019/082888, which has an international filing date of Apr. 16, 2019, the entire contents of which are incorporated herein by reference.

FIELD

Example embodiments of the present application generally relate to the industrial control technologies, and more particularly, to a method and device for calling a program module in a programmable logic controller (PLC) ladder programming environment.

BACKGROUND

Artificial intelligence (AI) is having a significant impact on manufacturing industries. Manufacturers have begun to acknowledge and experience the advantages of AI. In particular, AI related to computer vision plays an important role in promoting manufacturing industries towards Industry 4.0.

PLCs range from small devices with tens of I/O to large rack-mounted modular devices with thousands of I/O. The data processed in PLC is huge, and can be used for a further analyzing process.

Ladder diagram (LD) programming language is a commonly used graphical programming language for a PLC. Ladder programming language has an advantage of being intuitive and easy to understand. The ladder diagram consists of contacts, coils and function blocks (FBs). The contacts represent logic input conditions such as external switches, buttons, and so on. The coils usually represent logic outputs used to control external indicators, contactors, and so on. FBs are used to indicate functions such as timers, counters or math operation additional instructions.

A program module for implementing an AI algorithm or function, hereinafter referred to as an "AI module", is usually compiled by a computer programming language such as C++ or C#. However, PLC programming engineers who are familiar with ladder programming are not necessarily proficient in AI knowledge. Therefore, many capabilities of the AI module are difficult to be applied in the PLC ladder programming environment, resulting in limited implementation of PLC control capabilities.

SUMMARY

Example embodiments of the present disclosure provide a method and device for calling a program module in a PLC ladder programming environment to enhance PLC control.

In at least one example embodiment, a method for calling a program module in a PLC ladder programming environment is provided. The method comprises:
 determining a first feature to be called in a PLC ladder programming environment and a second feature not to be called in the PLC ladder programming environment, from features implemented by an AI module compiled by a computer programming language;
 configuring the first feature as an interface conforming to an interface specification of the PLC ladder programming environment;
 configuring the second feature as a non-call method;
 packaging the non-call method and the interface into a dynamic link library (DLL); and
 importing the DLL into the PLC ladder programming environment.

Therefore, at least one example embodiment of the present disclosure configures a first feature that is required to be called in a PLC ladder programming environment to an interface that conforms to the interface specification of the PLC ladder programming environment from features implemented by an AI module, packages a method corresponding to a second feature that is not required to be called in the PLC ladder programming environment and the interface into a DLL, and imports the DLL into the PLC ladder programming environment. Therefore, the PLC ladder programming environment can automatically generate an FB module corresponding to the first feature based on the interface in the DLL. The first feature can be conveniently applied in the PLC ladder programming environment based on dragging and the like to operate the FB module, thereby enhancing the control capability of the PLC.

In at least one example embodiment, configuring the first feature as an interface conforming to an interface specification of the PLC ladder programming environment comprises: converting the first feature into a first method; configuring an input parameter type and an output parameter type of the first method based on the interface specification of the PLC ladder programming environment; and declaring the first method as a public function.

Therefore, the first method corresponding to the first feature is implemented as an interface that can be called by an external program based on declaring the first method as a public function, so that the PLC ladder programming environment can automatically generate a FB module corresponding to the first feature based on the interface. Moreover, since the input parameter type(s) and output parameter type(s) of the interface are set according to an interface specification of the PLC ladder programming environment, it can be avoided that the first method cannot be recognized in the PLC ladder programming environment due to different naming specifications.

In at least one example embodiment, configuring an input parameter type and an output parameter type of the first method based on the interface specification of a PLC ladder programming environment comprises: configuring the input parameter type of the first method to be String type or Boolean type; or configuring the output parameter type of the first method to be String type or Boolean type.

Therefore, considering that the computer programming language and the ladder programming language have the same command specification for the String type or the Boolean type, the input parameter type(s) and the output parameter type(s) of the first method are uniformly set to String type or Boolean type, a situation in which the first method cannot be recognized in the PLC ladder programming environment is well avoided.

In at least one example embodiment, configuring the second feature as a non-call method comprises: converting the second feature into a second method; and declaring the second method as a private function.

Therefore, by declaring the second method as a private function, the second method becomes a hidden function that is not recognized by an external program, and the FB module corresponding to the second method does not appear in the PLC ladder programming environment, thereby simplifying the PLC ladder programming interface.

In at least one example embodiment, a device for calling a program module in a PLC ladder programming environment is provided. The device comprises:
- a feature determining module, configured to determine a first feature to be called in a PLC ladder programming environment and a second feature not to be called in the PLC ladder programming environment, from features implemented by an AI module compiled by a computer programming language;
- a first configuring module, configured to configure the first feature as an interface conforming to an interface specification of the PLC ladder programming environment;
- a second configuring module, configured to configure the second feature as a non-call method;
- a packaging module, configured to package the non-call method and the interface into a DLL;
- an importing module, configured to import the DLL into the PLC ladder programming environment.

Therefore, at least one example embodiment of the present disclosure configures a first feature that is required to be called in a PLC ladder programming environment to an interface that conforms to the interface specification of the PLC ladder programming environment from features implemented by an AI module, packages a method corresponding to a second feature that is not required to be called in the PLC ladder programming environment and the interface into a DLL, and imports the DLL into the PLC ladder programming environment. Therefore, the PLC ladder programming environment can automatically generate a FB module corresponding to the first feature based on the interface in the DLL. The first feature can be conveniently applied in the PLC ladder programming environment based on dragging and the like to operate the FB module, thereby enhancing the control capability of the PLC.

In at least one example embodiment, the first configuring module is further configured to convert the first feature into a first method, to configure an input parameter type and an output parameter type of the first method based on the interface specification of the PLC ladder programming environment, and to declare the first method as a public function.

Therefore, the first method corresponding to the first feature is implemented as an interface that can be called by an external program based on declaring the first method as a public function, so that the PLC ladder programming environment can automatically generate a FB module corresponding to the first feature based on the interface. Moreover, since the input parameter type(s) and output parameter type(s) of the interface are set according to an interface specification of the PLC ladder programming environment, it can be avoided that the first method cannot be recognized in the PLC ladder programming environment due to different naming specifications.

In at least one example embodiment, the first configuring module is further configured to configure the input parameter type of the first method to be String type or Boolean type, or to configure the output parameter type of the first method to be String type or Boolean type.

Therefore, considering that the computer programming language and the ladder programming language have the same command specification for the String type or the Boolean type, the input parameter type(s) and the output parameter type(s) of the first method are uniformly set to String type or Boolean type, a situation in which the first method cannot be recognized in the PLC ladder programming environment is well avoided.

In at least one example embodiment, the second configuring module is configured to convert the second feature into a second method and declare the second method as a private function.

Therefore, by declaring the second method as a private function, the second method becomes a hidden function that is not recognized by an external program, and the FB module corresponding to the second method does not appear in the PLC ladder programming environment, thereby simplifying the PLC ladder programming interface.

In at least one example embodiment, a device for calling a program module in a PLC ladder programming environment is provided. The device comprises a processor and a memory, wherein an application program executable by the processor is stored in the memory for causing the processor to execute a method for calling a program module in a PLC ladder programming environment according to any one of the above example embodiments.

In at least one example embodiment, a computer-readable medium comprising computer-readable instructions stored thereon is provided, wherein the computer-readable instructions are for executing a method for calling a program module in a PLC ladder programming environment according to any one of the above example embodiments.

BRIEF DESCRIPTION OF THE DRAWINGS

In order to make technical solutions of examples of the present disclosure clearer, accompanying drawings to be used in description of the examples will be simply introduced hereinafter. Obviously, the accompanying drawings to be described hereinafter are only some examples of the present disclosure. Those skilled in the art may obtain other drawings according to these accompanying drawings without creative labor.

FIG. 3 is a schematic diagram of storing an SCL file in a PLC ladder programming environment according to an example embodiment of the present invention.

FIG. 5 is a schematic diagram showing display of input parameters and output parameters of a camera included in a visual detection module according to an example embodiment of the present invention.

Figure 1:
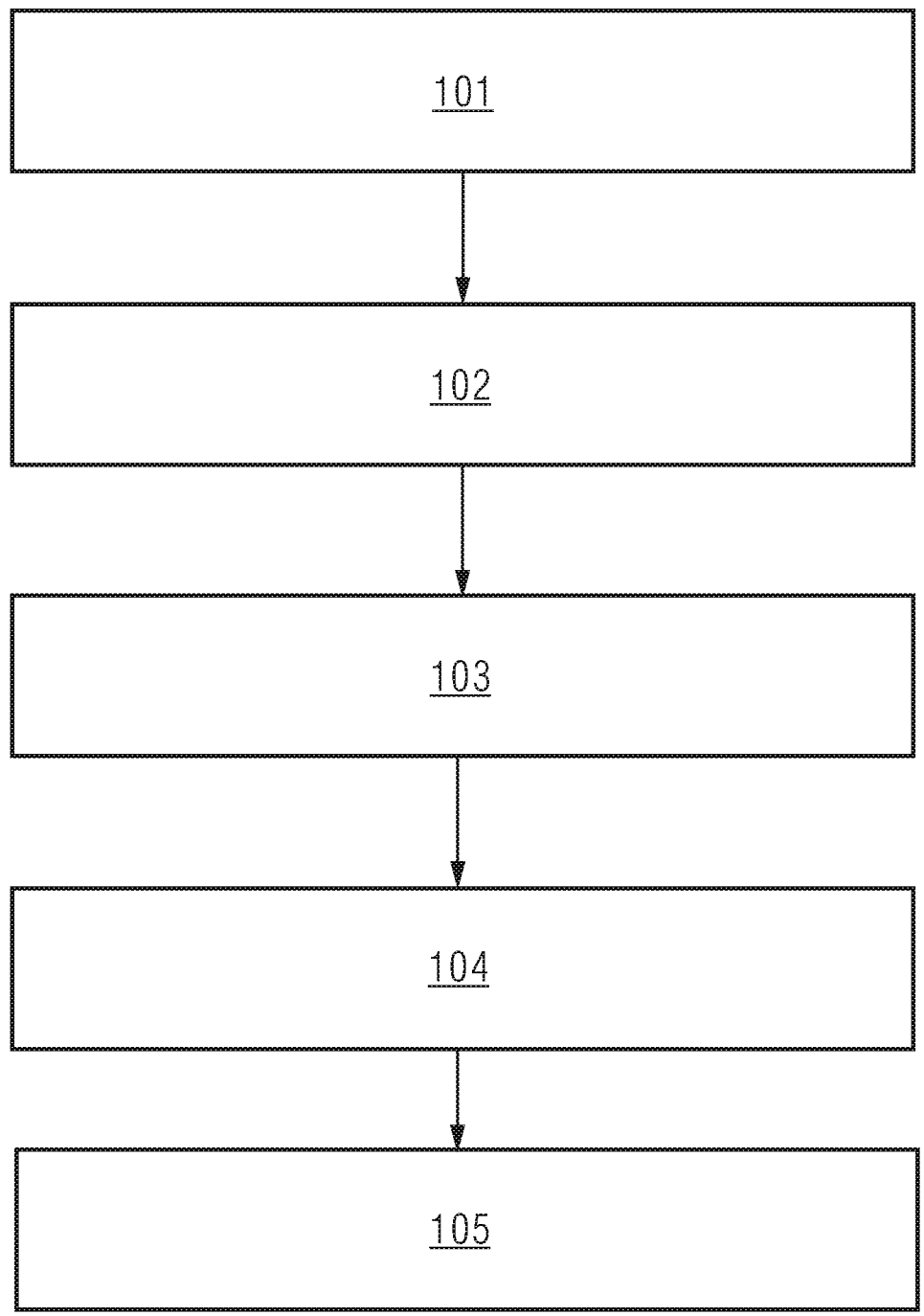
FIG. 1 is a schematic diagram of a program module calling method in a PLC ladder diagram programming environment implemented by an example embodiment of the present invention.

| List of reference numbers: | |
|---|---|
| reference numbers | meanings |
| 101~105 | steps |
| 20 | visual detection module |
| 201 | feature for detecting a scratch |
| 202 | feature for detecting a surface-defect |
| 203 | feature for detecting label-position |
| 204 | feature for photographing |
| 205 | feature for connecting a camera |
| 70 | external source folder |
| 71 | SCL file |
| 400 | configuration area |
| 401 | acquisition area |
| 402 | camera area |
| 30 | scratch detection FB module |
| 800 | PLC ladder programming environment |
| 801 | FB module |
| 802 | C++ library |
| 803 | OpenCV version 4.0 |
| 804 | deep learning deployment toolkit |
| 805 | TensorFlow |
| 806 | MXNET |
| 807 | ONNX |
| 808 | YOLO Version 3 |
| 809 | Region-Based Convolution Network |
| 810 | OpenPose |
| 900 | feature for SIFT |
| 901 | template URL |
| 902 | captured image URL |
| 903 | result |
| 904 | text message |
| 500 | device for calling a program module in a PLC ladder programming environment |
| 501 | feature determining module |
| 502 | first configuring module |
| 503 | second configuring module |
| 504 | packaging module |
| 505 | importing module |
| 600 | device for calling a program module in a PLC ladder programming environment, |
| 601 | processor |
| 602 | memory |

DETAILED DESCRIPTION

In order to make the technical solutions and advantages of the present invention more comprehensible, the present invention will be further described in detail below with reference to the accompanying drawings and embodiments. It is understood that the specific embodiments described herein are merely illustrative of the present invention and are not intended to limit the scope of the invention.

For the sake of brevity and clarity of the description, the aspects of the present invention are set forth below by describing several representative embodiments. Numerous details in the embodiments are only configured to assist in understanding the aspects of the present invention. However, it is obvious that the technical solution of the present invention can be implemented without being limited to these details. In order to avoid unnecessarily obscuring aspects of the present invention, some embodiments are not described in detail, but only the framework is given. Hereinafter, "including" means "including but not limited to", and "according to" means "at least according to . . . , but not limited to only based on". Due to the language habit of Chinese, the number of one component is not specifically indicated below, which means that the component may be one or more, or may be understood as at least one.

The inventors have found that AI modules are usually compiled by computer programming languages such as C++ or C# in PLC programming process, while PLC programming engineers familiar with ladder programming are not necessarily proficient in computer programming languages. This results in many capabilities of AI module being difficult to be applied in the PLC ladder programming environment, thereby limiting the realization of PLC control capability. In addition, the inventors also found that by configuring a feature (that is, the first feature) that needs to be called in a PLC ladder programming environment to an interface that conforms to the interface specification of the PLC ladder programming environment from features implemented by an AI module, packaging a method corresponding to a feature (that is, the second feature) that is not required to be called in the PLC ladder programming environment and the interface into a DLL and importing the DLL into the PLC ladder programming environment, a FB module corresponding to the first feature is automatically generated based on the interface in the DLL. The first feature can be conveniently applied in the PLC ladder programming environment based on dragging and the like to operate the FB module, thereby enhancing the control capability of PLC. Based on this, example embodiments of the present invention provide a program module calling method, device and computer-readable medium in a PLC ladder programming environment, which are specifically described as follows.

An example embodiment of the invention proposes a program module calling method in a PLC ladder programming environment.

FIG. 1 is a schematic diagram of a program module calling method in a PLC ladder diagram programming environment implemented by an example embodiment of the present invention.

As shown in FIG. 1, the method may include the following steps.

Step 101: Determining a first feature to be called in a PLC ladder programming environment and a second feature not to be called in the PLC ladder programming environment, from features implemented by an AI module compiled by a computer programming language.

An AI module usually contains one or more features. Based on whether it needs to be called in the PLC ladder programming environment, each feature implemented by the AI module can be determined as the first feature or the second feature, respectively. Where: one or more features that need to be called in the PLC ladder programming environment are determined to be the first features; one or more features that are not required to be called in the PLC ladder programming environment are determined to be the second features.

Among them, the computer programming language for compiling the AI module can be implemented as a C++ programming language, a C# programming language, a C programming language, a JAVA programming language, and the like.

Preferably, the AI module can be implemented as a machine vision AI module, such as a visual detection module or a robot vision module. Specifically, a visual detection module is configured to perform high-accuracy quantitative detection based on an AI algorithm (e.g., cell classification of photomicrographs, size and position measurement of mechanical components, etc.) and qualitative or semi-quantitative detection of a non-measuring device (e.g., visual inspection of products, component identification and positioning on assembly lines, defect detection and assembly integrity testing, etc.). The robot vision module is used to guide a robot's operation and action in a wide range based on AI algorithm, such as picking up work piece from a messy work piece pile sent from the hopper and placing it on conveyor belt or other equipment in a certain orientation.

Preferably, the AI module may also be implemented as a vibration detection module that monitors a mechanical vibration state based on an AI algorithm, or a sound detection module that detects sound based on an AI algorithm, and the like.

The above describes typical examples of a computer programming language and AI module, and those skilled in the art will appreciate that the description is merely exemplary and is not intended to limit the scope of the embodiments of the present invention or the claims.

In the following, the AI module is specifically implemented as a visual detection module as an example to describe how to determine features implemented by the AI module as the first feature or the second feature.

Figure 2:
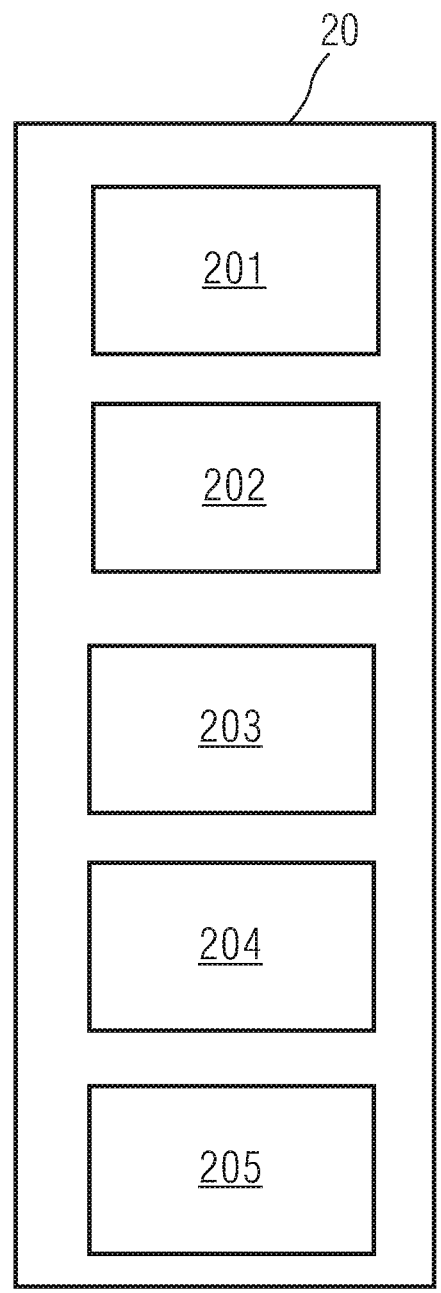
FIG. 2 is an exemplary structural diagram of a visual detection module implemented by an AI algorithm according to an example embodiment of the present invention.

FIG. 2 is an exemplary structural diagram of a visual detection module implemented by an AI algorithm according to an example embodiment of the present invention.

As shown in FIG. 2, the visual detection module 20 comprises feature 201 for detecting a scratch, feature 202 for detecting a surface-defect, feature 203 for detecting label-position, feature 204 for photographing and feature 205 for connecting a camera.

Feature 205 for connecting a camera is configured to establish a connection with a camera. Feature 204 for photographing is configured to perform photographing on a work piece based on the connection with the camera. Feature 203 for detecting label-position is configured to detect information related to a label based on a photograph, including whether there is a label, whether the label position is deviated, whether the label is broken, the label mark (LOGO) position, and the like. Feature 202 of the surface-defect detection is configured to detect a defect state of a work piece surface based on the photograph, such as determining whether there is cracking or silver streak surface defects such as grooves, ripples, ripples and embrittlement. Feature 201 for detecting a scratch is configured to detect scratches on the surface of a work piece based on the photograph.

In at least one example embodiment of the present invention, a respective feature implemented by the visual detection module 20 is determined as the first feature or the second feature based on whether it is required to be utilized in the PLC ladder programming environment or not. The first feature is a feature that needs to be utilized in the PLC ladder programming environment, and the number thereof may be one or more. The second feature is a feature that does not need to be utilized in a PLC ladder programming environment, and the number thereof may also be one or more.

Example 1: When it is only necessary to utilize feature 201 for detecting a scratch in a PLC ladder programming environment, the feature 201 for detecting a scratch is determined as a first feature, and feature 202 for detecting a surface-defect, feature 203 for detecting label-position, feature 204 for photographing and feature 205 for connecting the camera are respectively determined as second features.

Example 2: When feature 201 for detecting a scratch and feature 202 for detecting a surface-defect are required to be utilized in the PLC ladder programming environment, feature 201 for detecting a scratch and feature 202 for detecting a surface-defect are respectively determined as a first feature, and feature 203 for detecting label-position, feature 204 for photographing and feature 205 for connecting the camera are respectively determined as second features.

Example 3: When feature 201 for detecting a scratch and feature 203 for detecting label-position are required to be utilized in the PLC ladder programming environment, the feature 201 for detecting a scratch and feature 203 for detecting label-position are respectively determined as a first feature, and feature 202 for detecting a surface-defect, feature 204 for photographing and feature 205 for connecting the camera are respectively determined as second features.

The above is an example in which an AI module is implemented as a visual detection module and cases where features implemented by the AI module are determined as the first feature or the second feature is described. Those skilled in the art will appreciate that the description is merely an example. It is not intended to limit the scope of the example embodiments of the invention or the claims. For example, the AI module can also be implemented as a robot vision module, a vibration detection module or a sound detection module, and the like.

Step 102: Configuring the first feature as an interface conforming to an interface specification of the PLC ladder programming environment.

In one example embodiment, wherein configuring the first feature determined in Step 102 as an interface conforming to an interface specification of the PLC ladder programming environment comprises: converting the first feature into a first method; configuring an input parameter type and an output parameter type of the first method based on the interface specification of the PLC ladder programming environment; declaring the first method as a public function. The specific process of converting the first feature into the first method comprises: determining one or more code segments corresponding to the first feature, and packaging the one or more code segments into the first method.

Preferably, considering that a computer programming language (e.g. C++, C# or JAVA) and ladder programming language have a same command specification for String type or Boolean type, the input parameter types of the first method are set to String type or Boolean type and the output parameter types of the first method are set to String type or Boolean type too, a situation in which the first method cannot be recognized in a PLC ladder programming environment due to the difference in naming convention between the PLC ladder programming environment and the computer programming language is well avoided.

After declaring the first method conforming to the interface specification of the PLC ladder programming environment as a public function, the first method is equivalent to an interface that can be called by external programs.

Step 103: Configuring the second feature as a non-call method.

In one example embodiment, wherein configuring the second feature as a non-call method comprises: converting the second feature into a second method, and declaring the second method as a private function. The specific process of converting the second feature into the first method comprises: determining one or more code segments corresponding to the second feature, and packaging the one or more code segments into the second method.

Therefore, after declaring the second method as a private function, the second method is equivalent to a hidden function that is not recognized by external programs.

Preferably, Step 102 and Step 103 can be specifically performed in a computer programming language compilation environment with Visual Studio as an example.

For example, in Step 102, the input parameters of the method corresponding to the feature for detecting a scratch determined as the first feature in Step 101 are set in Visual Studio compilation environment as:

(1) Photoelectric sensor signal, named REQ, is configured as Boolean type, where 1 indicates that a photoelectric sensor is blocked by a work piece, that is, the work piece is detected, and 0 indicates that the photoelectric sensor is not blocked by a work piece, that is, the work piece is not detected;

(2) camera IP address signal, named myIPPort, configured as String type, for inputting camera IP address;

(3) camera shooting parameters, named myRequest1, configured as String type, for inputting shooting parameters such as exposure time, sensitivity, etc.

(4) storage location of captured images, named myRequest2, configured as String type, for inputting a specific storage location of captured images.

Moreover, in Step 102, the output parameters of the method corresponding to the feature for detecting a scratch determined as the first feature in Step 101 are set in a Visual Studio compilation environment as:

(1) a first output signal of the detection result, named myPass, is configured as Boolean type, where 1 indicates that a scratch is detected, 0 indicates that no scratch is detected;

(2) a second output signal of the detection result, named myRely, configured as String type, in which the detection result is described in the form of a string, such as "cannot connect to the camera", "camera connection is unstable", and the like.

The above describes the process of configuring the input parameters and output parameters of the first feature by taking the feature for detecting a scratch as an example. Those skilled in the art will appreciate that the description above is merely an example and is not intended to limit the protection scope of embodiments of the present invention or the claims.

Step 104: Packaging the non-call method and the interface into a DLL.

Here, the non-call method and interface can be packaged as a DLL in a development environment corresponding to the AI module compiled language.

For example, when the AI module is compiled by a computer programming language such as C++, C#, or JAVA, the non-call method and the interface can be packaged into a DLL in a Visual Studio computer programming language compilation environment. For example, specific versions of Visual Studio that may be used to package DLL comprise: Visual Studio 2008; Visual Studio 2010; Visual Studio 2012; Visual Studio 2013; Visual Studio 2014; Visual Studio 2015, and so on.

The above-described example description of the compilation environment for packaging non-call method and interface as DLL will be appreciated by those skilled in the art that this description is merely an example and is not intended to limit the protection scope of embodiments of the present invention or the claims.

Step: 105: Importing the DLL into the PLC ladder programming environment.

Here, the DLL packaged in Step 104 is imported into the PLC ladder programming environment, and the PLC ladder programming environment can automatically generate a FB module corresponding to the interface in the DLL.

For example, when the PLC ladder programming environment is implemented as a Totally Integrated Automation (TIA) portal, the DLL can be imported into a target project folder of the TIA Portal. Based on the DLL, the TIA Portal automatically generates a file in a Structured Control Language (SCL) format in an external source folder. An interface that can be converted into a FB module is declared in the SCL file. Then, by receiving a trigger command (e.g., a right click) for the SCL file, a FB module having the first feature corresponding to the interface can be generated.

FIG. 3 is a schematic diagram of storing an SCL file in a PLC ladder programming environment according to an example embodiment of the present invention. As shown in FIG. 3, the SCL file ODK_zeromk.scl (where the SCL file can be automatically named by TIA Portal) 71 automatically generated by a TIA Portal based on the import of the DLL is automatically saved in an external source folder 70 of the TIA Portal. When an interface that can be converted into a FB module is declared in the SCL file 71 and the TIA Portal receives a trigger command issued by the user right-clicking the SCL file 71, the TIA Portal automatically generates a FB module based on the SCL file 71. The FB module has a first feature corresponding to the interface. When the SCL file 71 declares multiple interfaces that can be converted respectively into the FB module and the TIA Portal receives a trigger command issued by the user right-clicking the SCL file 71, the TIA Portal automatically generates multiple FB modules based on the SCL file 71. Each FB module has a first feature corresponding to its respective interface.

When applying a FB module in the PLC ladder programming environment, it is usually necessary to set environment variables (such as system time, font of output text, size of output text, etc.).

In the following TIA Portal environment, as an example, the AI module is implemented as a visual detection module with three cameras, the first feature is the feature for detecting a scratch and the three cameras are associated with the feature for detecting a scratch, to explain the environment variables setting process.

Figure 4:
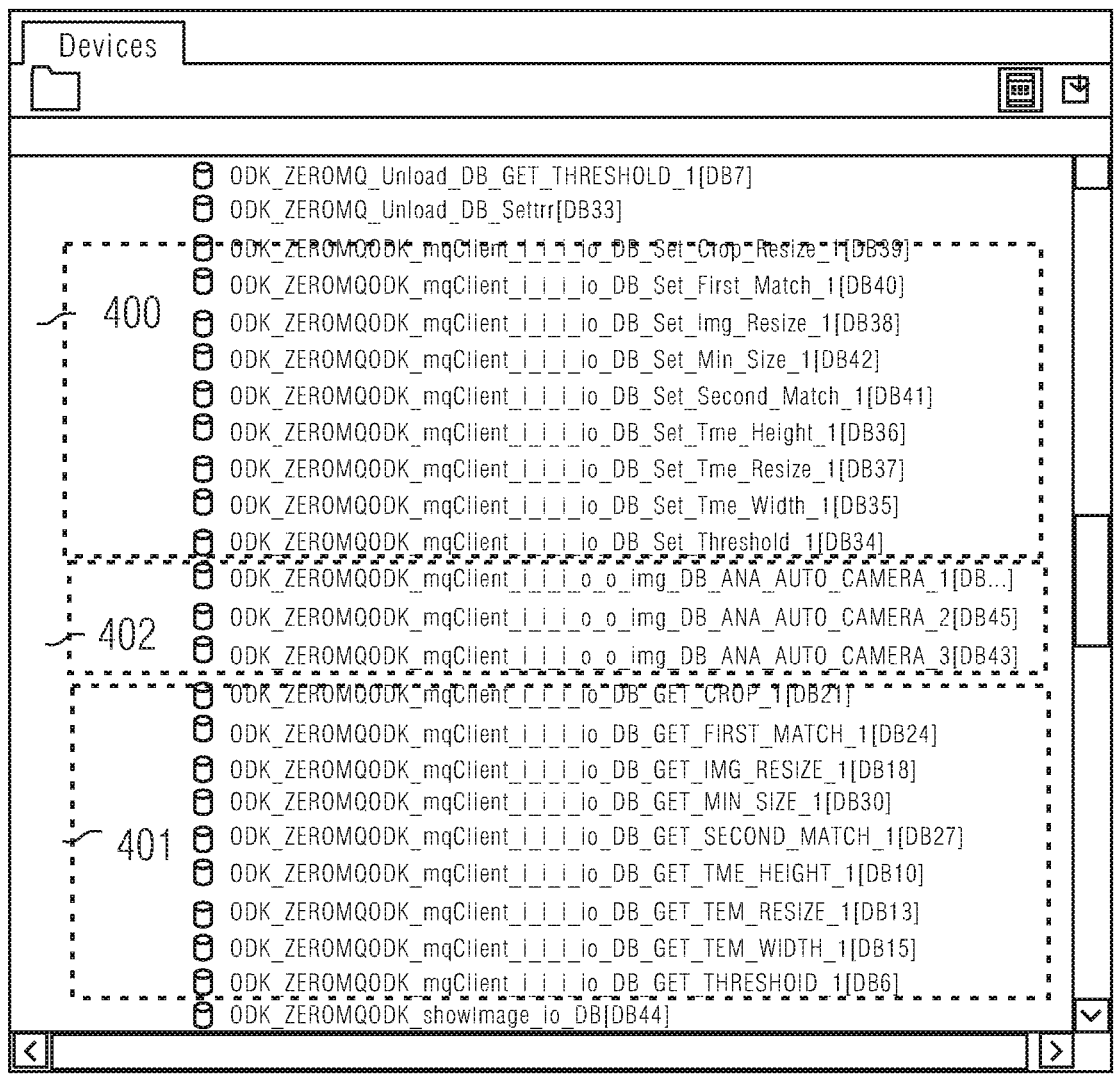
FIG. 4 is a schematic diagram of configuring environment variables of a visual detection module according to an example embodiment of the present invention.

FIG. 4 is a schematic diagram of configuring environment variables of a visual detection module according to an example embodiment of the present invention.

As can be seen from FIG. 4, the environment variables of the visual detection module can be configured in the "Device" property of the project tree of a TIA Portal. For example, the setting area comprises a configuration area 400, an acquisition area 401 and a camera area 402. The configuration area 400 comprises a running environment setting parameter of the visual detection module such as system time, default time zone and the like. The acquisition area 401 comprises a preset parameter of output values of the visual detection module, such as default font for outputting text, default size of outputting text, etc. Camera area 402 comprises setting parameters of a camera in which three cameras are presented: camera 1 (named ODK_ZEROMQODK_mqClient_i_i_i_o_o_img_DB_ANA_AUTO_CAMERA_1), camera 2 (named ODK_ZEROMQODK_mqClient_i_i_i_o_o_img_DB_ANA_AUTO_CAMERA_2), camera 3 (named ODK_ZEROMQODK_mqClient_i_i_i_o_o_img_DB_ANA_AUTO_CAMERA_3).

When a certain camera in the camera area 402 is triggered, the input parameters and output parameters of the triggered camera associated with the feature for detecting a scratch can be specifically displayed in a new interface.

FIG. 5 is a schematic diagram showing display of input parameters and output parameters of a camera comprised in a visual detection module according to an example embodiment of the present invention. When the camera 1 in the camera area 402 of FIG. 4 is triggered, the interface shown in FIG. 5 is displayed.

As can be seen from FIG. 5, the input parameters of the feature for detecting a scratch associated with the camera 1 comprise: (1) photoelectric sensor signal generated based on user configuration, named REQ; (2) camera IP address signal generated based on user configuration, named myIPPort; (3) camera shooting parameters generated based on user configuration, named myRequest1; (4) storage location of captured images generated based on user configuration, named myRequest2. The parameters of the feature for detecting a scratch associated with the camera 1 comprise: error (ERROR) signal generated by the TIA Portal by default, completed (DONE) signal generated by the TIA Portal by default, busy (BUSY) signal generated by the TIA Portal by default, status (STATUS) signal generated by the TIA Portal by default, the first output signal (named myPass) generated based on user configuration and the second output signal (named myRely) generated based on user configuration.

The input and output signals may both include attributes comprising Data Type, Start Value, Retain, Accessible, Readable, Writeable, Visible Set point and Supervisor. Among them, the data types of the input and output signals are not editable by default to prevent them from being recognized in the PLC ladder programming environment due to incorrect editing, while the other attributes of the input and output signals are editable.

The PLC ladder programming environment is described above with the TIA Portal as an example, and those skilled in the art will appreciate that this description is merely an example. In fact, the PLC ladder programming environment can also be implemented as other PLC programming environments, which are not limited by the embodiments of the present invention or the claims.

After the PLC compiler generates a FB module, the PLC programming engineer can call the FB module in the PLC ladder programming environment based on drag and drop. For example, a PLC programming engineer can drag a FB module into a ladder execution sequence in a PLC ladder programming environment, and the PLC programming engineer configures specific values of the input parameters of the FB module in the ladder execution sequence. Then, the PLC compiler executes the ladder execution sequence to introduce the AI feature into the PLC.

Figure 6:
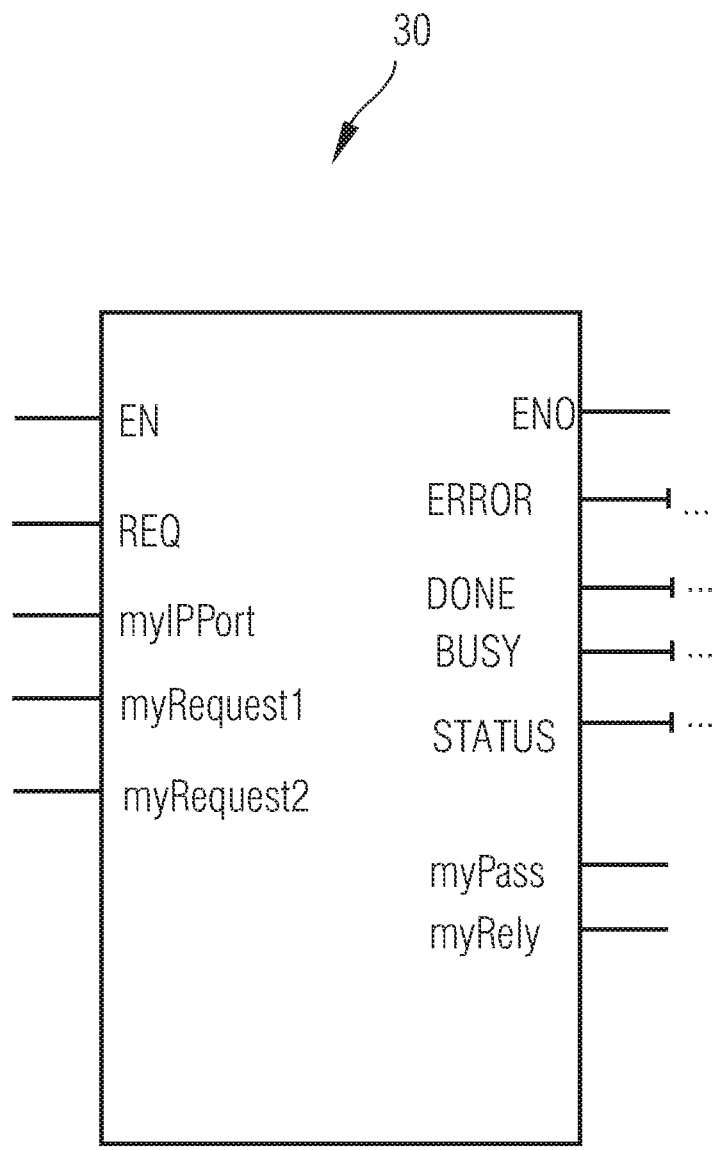
FIG. 6 is a schematic diagram of parameter configuration of scratch detection FB module according to an example embodiment of the present invention.

FIG. 6 is a schematic diagram of parameter configuration of a scratch detection FB module according to an example embodiment of the present invention.

As can be seen from FIG. 6, the scratch detection FB module 30 generated by a PLC compiler is shown as a block on the interface of the PLC ladder programming environment. The left side of the box is the input side and the right side is the output side.

Specifically, the input parameters of the scratch detection FB module 30 comprise:
(1) An enable (EN) signal automatically generated by a PLC compiler is configured as Boolean type, where 0 indicates non-enable and 1 indicates enable.
(2) A photoelectric sensor signal (REQ) generated based on user configuration is configured as Boolean type, wherein 1 indicates that the photoelectric sensor is blocked by a work piece, and 0 indicates that the photoelectric sensor is not blocked by a work piece.
(3) A camera IP address signal (myIPPort) generated based on user configuration is configured as String type for inputting the camera IP address.
(4) Camera shooting parameters (myRequest 1) generated based on user configuration is configured as String type for inputting camera shooting parameters such as exposure time and sensitivity.
(5) The storage location (myRequest2) of captured images generated based on user configuration, configured as String type, for inputting a specific storage location of captured images.

Moreover, the output parameters of the scratch detection FB module 30 generated by the PLC compiler comprise:
(1) An enable output signal (ENO) automatically generated by the PLC compiler is configured as Boolean type, where 0 indicates not enabled, 1 indicates enable.
(2) An error (ERROR) signal automatically generated by the PLC compiler is configured as Boolean type.
(3) A completed (DONE) signal automatically generated by the PLC compiler is configured as Boolean type.
(4) A busy (BUSY) signal automatically generated by the PLC compiler is configured as Boolean type.
(5) A status (STATUS) signal automatically generated by the PLC compiler is configured as Integer type.
(6) A first output signal (myPass) generated based on user configuration, configured as Boolean type.
(7) A second output signal (myRely) generated based on user configuration is configured as a String type.

It can be seen that the input parameters of the scratch detection FB module 30 generated by the PLC compiler correspond respectively to the input parameters setting for the first method corresponding to feature for detecting a scratch in Step 102, and the output parameters of the scratch detection FB module 30 generated by the PLC compiler correspond respectively to the output parameters setting for the first method corresponding to the feature for detecting a scratch in Step 102.

A PLC programming engineer drags the scratch detection FB module 30 to a ladder execution sequence in the PLC ladder programming environment, and then configures specific values of the input parameters of the scratch detection FB module 30 in the ladder execution sequence.

Figure 7:
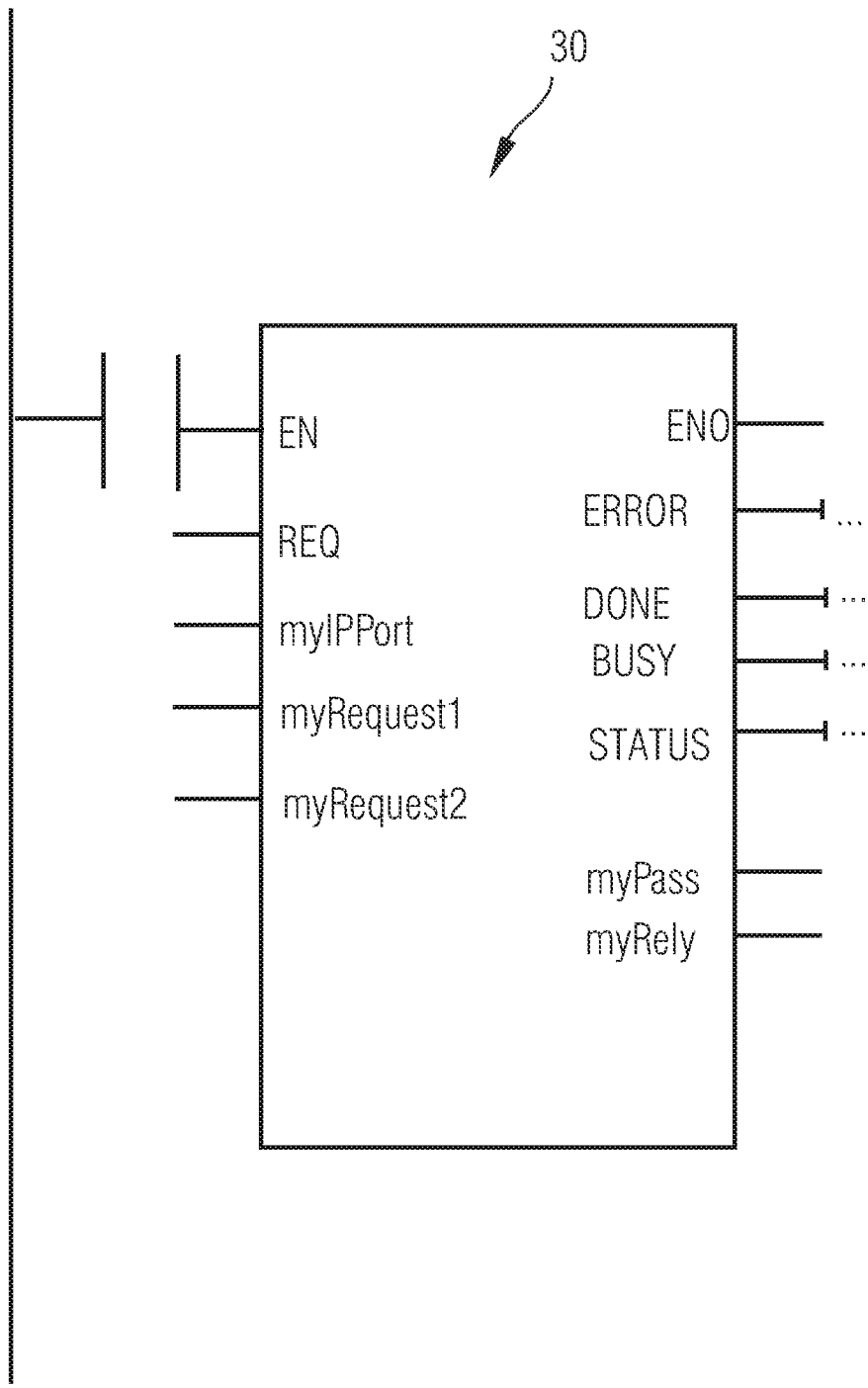
FIG. 7 is a schematic diagram showing the arrangement of scratch detection FB module in an execution sequence according to an example embodiment of the present invention.

FIG. 7 is a schematic diagram showing the arrangement of a scratch detection FB module in an execution sequence according to an example embodiment of the present invention.

For example, a PLC programming engineer can specifically fill in camera IP addresses of String type in the camera IP address signal (myIPPort) of the scratch detection FB module 30, camera shooting parameters such as exposure time, sensitivity, etc. of String type in the camera shooting parameter (myRequest1) of the scratch detection FB module 30, storage location of captured images of String type in the storage location of captured images (myRequest2). Moreover, the PLC programming engineer can connect the photo sensor signal (REQ) to a photo sensor used to provide a Boolean photo sensor signal and connect the EN signal to a bus in the execution sequence.

When the values of input parameters are filled in, the PLC programming engineer can trigger the PLC compiler to execute the ladder execution sequence. At this time, the scratch detection FB module 30 outputs a first output signal (myPass) for indicating whether or not a scratch is detected and a second output signal (myRely) for explaining the detection result.

It can be seen that in at least this example embodiment of the present invention, the PLC programming engineer is not required to master AI knowledge, and the various capabilities in the AI module can be introduced into the PLC, thereby enriching the processing capability of the PLC.

Figure 8:
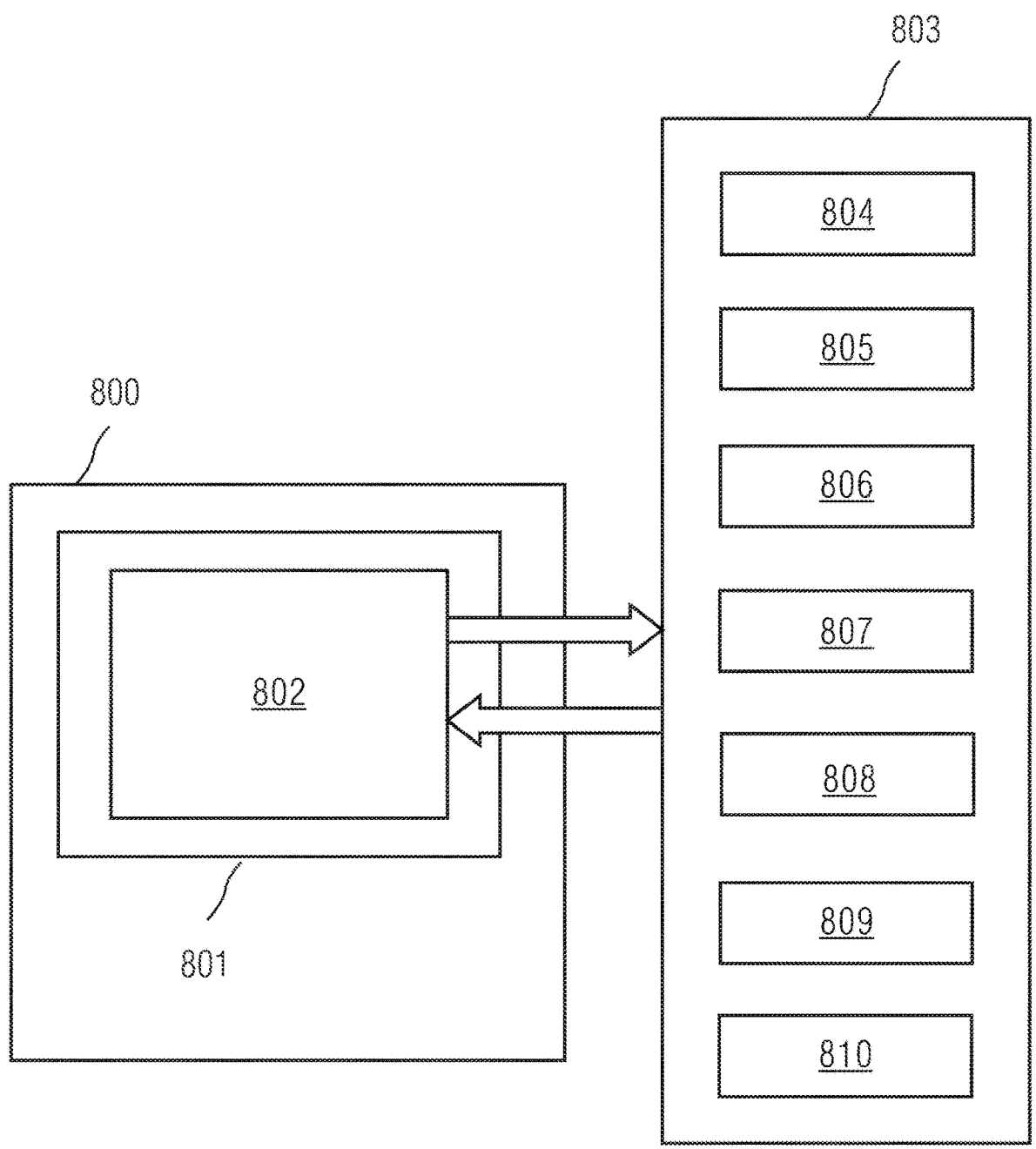
FIG. 8 is a schematic diagram of capabilities newly added in a PLC ladder programming environment based on program module calling according to an example embodiment of the present invention.

FIG. 8 is a schematic diagram of capabilities newly added in a PLC ladder programming environment based on program module calling according to an example embodiment of the present invention.

As can be seen from FIG. 8, a FB module 801 supporting the C++ library 802 can be added to the PLC ladder programming environment 800 based on an example embodiment of the present invention. By dragging the FB module 801 in the PLC ladder programming environment, many capabilities supported by OpenCV version 4.0 (or above) 803 can be implemented in PLC, such as deep learning deployment toolkit 804, TensorFlow 805, MXNET 806, Open Neural Network Exchange (ONNX) 807, Region-based Convolution Network 808, YOLO Version 3 809 and Open Pose 810, etc.

The above describes some new capabilities of a PLC ladder programming environment based on a program module calling. Those skilled in the art can appreciate that the description is only an example and is not intended to limit the scope of the embodiments of the present invention or the claims.

For example, Scale-Invariant Feature Transform (SIFT) capability can also be implemented in a PLC.

Figure 9:
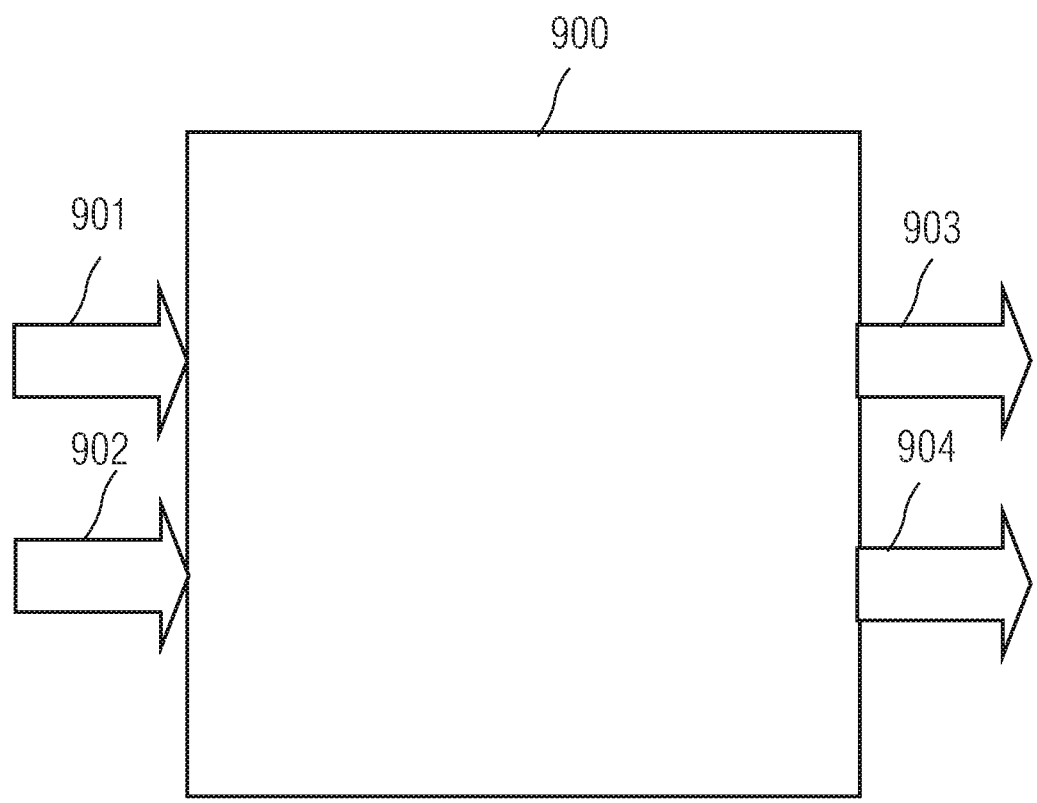
FIG. 9 is a schematic diagram of adding a SIFT algorithm in a PLC ladder programming environment according to an example embodiment of the present invention.

FIG. 9 is a schematic diagram of adding a SIFT algorithm in a PLC ladder programming environment according to an example embodiment of the present invention.

Based on the flow shown in FIG. 1, feature 900 of SIFT comprised in an AI module is determined as a first feature, and the other features comprised in the AI module are determined as second features. The first feature is converted to a first method and second features are converted to second methods. Parameter types of template URL 901 and captured image URL 902 of the input parameters of the first method are configured based on interface specification of the PLC ladder programming environment. Parameter types of result 903 and text message 904 of the output parameters of the first method are configured based on an interface specification of the PLC ladder programming environment. The first method is declared as a public function and the second methods are declared as private functions. The first method and the second methods are packaged into a DLL. After importing the DLL into a PLC ladder programming environment, the PLC ladder programming environment automatically generates a FB module corresponding to the interface in the DLL. Therefore, the feature 900 of SIFT can be freely called by dragging the FB module in the PLC ladder programming environment.

Based on the above description, example embodiments of the present invention also propose a program module calling device in a PLC ladder programming environment.

Figure 10:
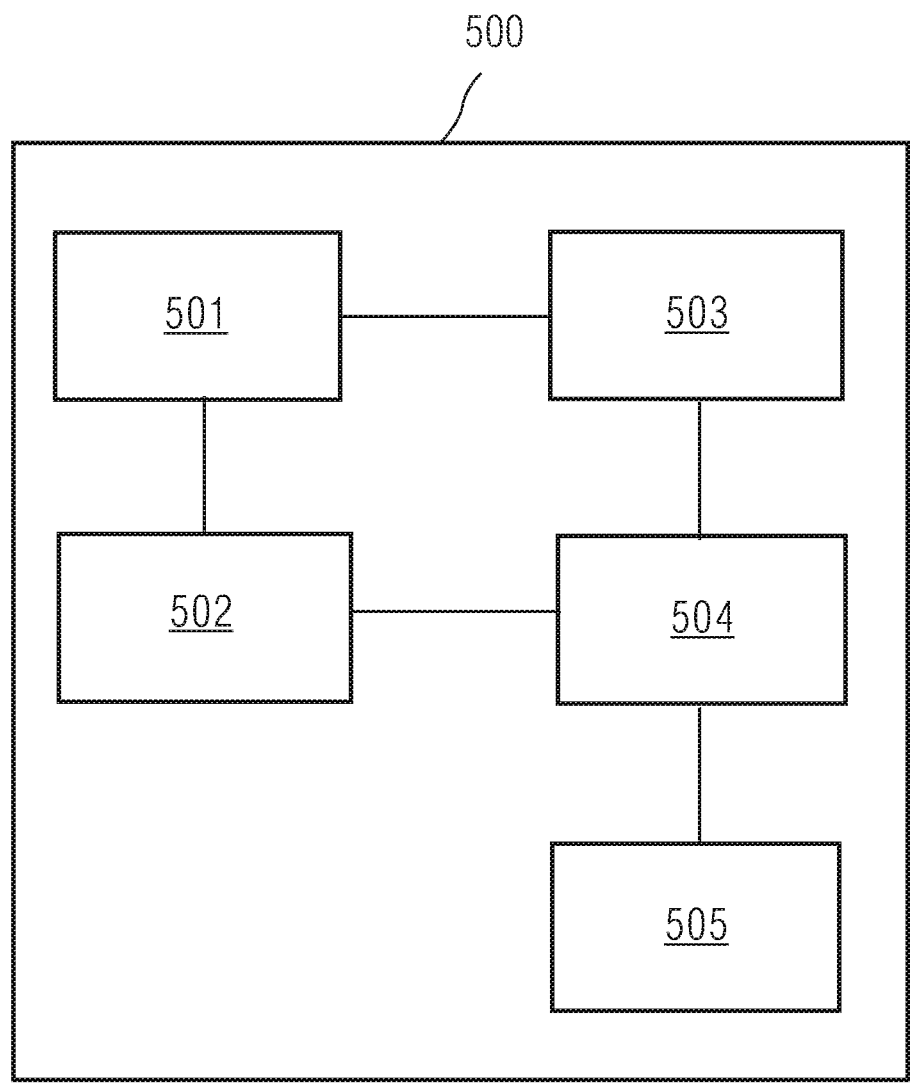
FIG. 10 is a first example structural diagram of a program module calling device in a PLC ladder programming environment implemented by an example embodiment of the present invention.

FIG. 10 is a first example structural diagram of a program module calling device in a PLC ladder programming environment implemented by an example embodiment of the present invention.

As shown in FIG. 10, a device 500 for calling a program module in a PLC ladder programming environment, comprising:

a feature determining module 501, configured to determine a first feature to be called in a PLC ladder programming environment and a second feature not to be called in the PLC ladder programming environment, from features implemented by an AI module compiled by a computer programming language;

a first configuring module 502, configured to configure the first feature as an interface conforming to an interface specification of the PLC ladder programming environment;

a second configuring module 503, configured to configure the second feature as a non-call method;

a packaging module 504, configured to package the non-call method and the interface into a dynamic link library; and an importing module 505, configured to import the dynamic link library into the PLC ladder programming environment.

In one example embodiment, the first configuring module 502 is further configured to convert the first feature into a first method, to configure an input parameter type and an output parameter type of the first method based on the interface specification of the PLC ladder programming environment, and to declare the first method as a public function.

In one example embodiment, the first configuring module 502 is further configured to configure the input parameter type of the first method to be String type or Boolean type, or to configure the output parameter type of the first method to be String type or Boolean type.

In one example embodiment, the second configuring module 503 is further configured to convert the second feature into a second method, and to declare the second method as a private function.

Figure 11:
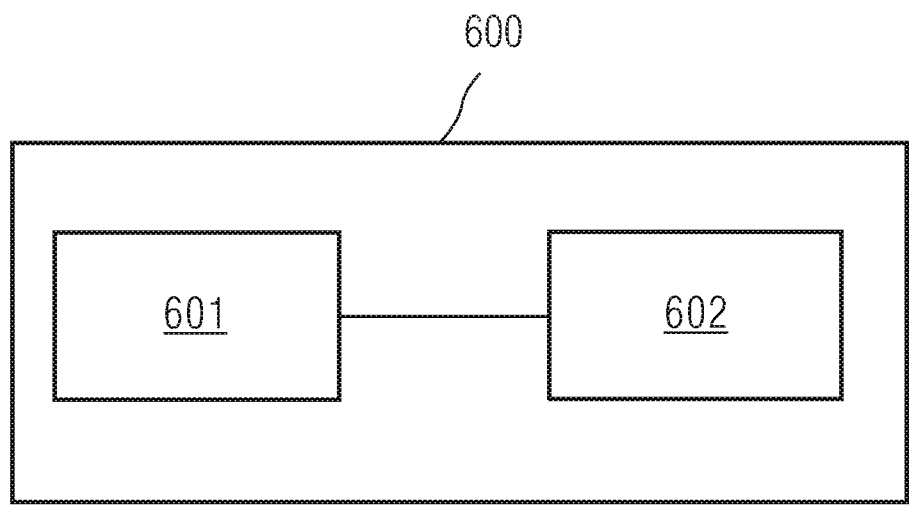
FIG. 11 is a second example structural diagram of a program module calling device in a PLC ladder programming environment implemented by an example embodiment of the present invention.

FIG. 11 is a second example structural diagram of a program module calling device in a PLC ladder programming environment implemented by an example embodiment of the present invention As shown in FIG. 11, a device 600 for calling a program module in a PLC ladder programming environment, comprising a processor 601 and a memory 602, wherein an application program executable by the processor is stored in the memory 602 for causing the processor 601 to execute a program module calling method in a PLC ladder programming environment according to any one of the methods described above.

It should be noted that not all the steps and modules in the foregoing processes and the various structural diagrams are necessary, and some steps or modules may be omitted according to actual needs. The order of execution of each step is not fixed and can be adjusted as needed. The division of each module is only for the convenience of description of the functional division. In actual implementation, one module can be implemented by multiple modules, and the functions of multiple modules can also be implemented by the same module. These modules can be located in the same device. It can also be located in different devices.

The hardware modules in the various embodiments may be implemented mechanically or electronically. For example, a hardware module can include specially designed permanent circuits or logic devices (such as dedicated processors such as FPGAs or ASICs) for performing specific operations. The hardware modules may also include programmable logic devices or circuits (such as including general purpose processors or other programmable processors) that are temporarily configured by software for performing particular operations. The hardware module can be implemented by mechanical means, by using a dedicated permanent circuit, or by using a temporarily configured circuit (such as software configuration), which can be determined based on cost and time considerations.

The present invention also provides a machine readable storage medium storing instructions for causing a machine to perform a method as described herein. In particular, a system or apparatus equipped with a storage medium on which software program code implementing the functions of any of the above-described embodiments is stored, and a computer (or CPU or MPU) of the system or apparatus may be stored Reading and executing the program code stored in the storage medium. In addition, some or all of the actual operations may be performed by an operating system or the like operating on a computer based on instructions of the program code. It is also possible to write the program code read out from the storage medium into a memory set in an expansion board inserted into the computer or into a memory set in an extension unit connected to the computer, and then install the program based on the instruction of the program code. The expansion board or the CPU or the like on the expansion unit performs part and all of the actual operations to implement the functions of any of the above embodiments.

Embodiments of storage medium for providing program code include floppy disks, hard disks, magneto-optical disks, optical disks (such as CD-ROM, CD-R, CD-RW, DVD-ROM, DVD-RAM, DVD-RW, DVD+RW), Tape, non-volatile memory card and ROM. Alternatively, the program code can be downloaded from a server computer or cloud by a communication network.

The above is only example embodiments of the present invention and is not intended to limit the scope of the present invention or the claims. Any modifications, equivalent substitutions, improvements, etc. made within the spirit and scope of the present invention are intended to be included within the scope of the present invention and the claims.

The present invention has been shown and described in detail with reference to the accompanying drawings and the example embodiments thereof, but the invention is not limited to these disclosed embodiments, and those skilled in the art may know that the various embodiments described above may be combined. The code review means in the present invention obtains more embodiments of the present invention, and these embodiments are also within the scope of the present invention.

What is claimed is:

1. A method for calling a program module in a programmable logic controller (PLC) ladder programming environment, the method comprising:
    determining one or more features of an artificial intelligence module as a first feature to be called in the PLC ladder programming environment, the artificial intelligence module being compiled by a computer programming language;
    determining one or more features of the artificial intelligence module as a second feature not to be called in the PLC ladder programming environment;
    configuring the first feature as an interface conforming to an interface specification of the PLC ladder programming environment, the configuring the first feature as the interface conforming to the interface specification of the PLC ladder programming environment including
        converting the first feature into a first method,
        configuring an input parameter type of the first method to be String type or Boolean type based on the interface specification of the PLC ladder programming environment,
        configuring an output parameter type of the first method to be String type or Boolean type based on the interface specification of the PLC ladder programming environment, and
        declaring the first method as a public function;
    configuring the second feature as a non-call method, the configuring the second feature as the non-call method including
        converting the second feature into a second method, and
        declaring the second method as a private function;
    packaging the non-call method and the interface into a dynamic link library; and
    importing the dynamic link library into the PLC ladder programming environment for calling the program module in the PLC ladder programming environment.

2. The method of claim 1, further comprising:
    applying the first feature in the PLC ladder programming environment.

3. The method of claim 1, wherein the packaging includes packaging the non-call method into the dynamic link library, and packaging the interface into the dynamic link library.

4. A device for calling a program module in a programmable logic controller (PLC) ladder programming environment, the device comprising:
    a processor; and
    a memory storing an application program executable by the processor for causing the processor to execute a method for calling a program module in a PLC ladder programming environment, the method comprising:
        determining one or more features of an artificial intelligence module as a first feature to be called in the PLC ladder programming environment, the artificial intelligence module being compiled by a computer programming language;
        determining one or more features of the artificial intelligence module as a second feature not to be called in the PLC ladder programming environment;
        configuring the first feature as an interface conforming to an interface specification of the PLC ladder programming environment, the configuring the first feature as the interface conforming to the interface specification of the PLC ladder programming environment including
            converting the first feature into a first method,
            configuring an input parameter type of the first method to be String type or Boolean type based on the interface specification of the PLC ladder programming environment,
            configuring an output parameter type of the first method to be String type or Boolean type based on the interface specification of the PLC ladder programming environment, and
            declaring the first method as a public function;
        configuring the second feature as a non-call method, the configuring the second feature as the non-call method including
            converting the second feature into a second method, and
            declaring the second method as a private function;
        packaging the non-call method and the interface into a dynamic link library; and
        importing the dynamic link library into the PLC ladder programming environment for calling the program module in the PLC ladder programming environment.

5. A non-transitory computer-readable medium storing computer-readable instructions for executing a method for calling a program module in a PLC ladder programming environment, the method comprising:
    determining one or more features of an artificial intelligence module as a first feature to be called in the PLC ladder programming environment, the artificial intelligence module being compiled by a computer programming language;
    determining one or more features of the artificial intelligence module as a second feature not to be called in the PLC ladder programming environment;
    configuring the first feature as an interface conforming to an interface specification of the PLC ladder programming environment, the configuring the first feature as the interface conforming to the interface specification of the PLC ladder programming environment including
        converting the first feature into a first method,
        configuring an input parameter type of the first method to be String type or Boolean type based on the interface specification of the PLC ladder programming environment,
        configuring an output parameter type of the first method to be String type or Boolean type based on the interface specification of the PLC ladder programming environment, and
        declaring the first method as a public function;
    configuring the second feature as a non-call method, the configuring the second feature as the non-call method including
        converting the second feature into a second method, and
        declaring the second method as a private function;
    packaging the non-call method and the interface into a dynamic link library; and
    importing the dynamic link library into the PLC ladder programming environment for calling the program module in the PLC ladder programming environment.

* * * * *